United States Patent Office 3,165,896
Patented Jan. 19, 1965

1

3,165,896
HYDRAULIC BRAKE
Philip Sidney Baldwin, 54 Via Maggio, Florence, Italy, assignor of fifty percent to Fiat Societa per Azioni, Turin, Italy
Filed Dec. 6, 1963, Ser. No. 328,580
Claims priority, application Italy, Dec. 15, 1962, 25,360/62
9 Claims. (Cl. 60—54.6)

This invention relates to a fluid pressure generating device for use in controlling hydraulic brake mechanisms, more particularly on motor vehicles, commonly known as a master cylinder.

The invention relates more particularly to devices of the type referred to above, comprising a cylinder, one piston at least slidably mounted in said cylinder and defining with the latter a compression chamber connected with external brake circuits, a spring biasing the piston to a predetermined starting position and a valve carried by the piston controlling intercommunication of the compression chamber and a fluid supply conduit to the cylinder.

In such known master cylinders a so-called make-up orifice is bored in the cylinder wall for connecting the compression chamber with the fluid supply conduit when the piston is in its starting position to which it is normally biased by the spring.

For this purpose the make-up orifice should be so located as to face, when the piston is in its initial position, a resilient seal on the valve controlling interconnection of the compression chamber and fluid supply conduit.

This known prior construction is objectionable, particularly where the seal comprises a ring floatingly received by a circumferential groove in the piston, on account of rapid wear of the circumferential seal portion, resulting in leakage at the contact region of the seal and inner cylinder wall.

This invention provides a brake master cylinder which obviates the above disadvantage.

More specifically the invention provides a brake master cylinder in which said valve controlling interconnection of the compression chamber and fluid supply conduit to the cylinder comprises in combination:

(a) An annular seal made of resilient material, floatingly received by a circumferential groove in the piston, the groove formed in the piston portion adjacent the compression chamber, the cross sectional area of the seal being defined by two radial side faces, a cylindrical inner surface and an outer surface of an arcuate profile, contacting at its apex the inner cylinder wall, said groove being laterally defined by two radial rigid abutments and a cylindrical bottom surface exceeding in width the axial thickness of the seal, the diameter of the groove cylindrical bottom surface being less than the seal bore, said groove connecting with the compression chamber through conduits provided in the piston body, opening at said cylindrical bottom surface;

(b) A rigid ring adjacent the face of the resilient seal remote from the compression chamber, larger in bore than said seal, mounted for movement substantially without any peripheral play with respect to the inner cylinder surface in a circumferential annular recess in the piston, said recess opening towards the said annular groove and being confined on the opposite side from the resilient seal by a radial annular abutment and at the bottom by an annular cylindrical surface smaller in diameter than the bore of said rigid ring, the annular recess in constant fluid communication with a passageway in the piston in turn in fluid communication with fluid supply conduits;

2

(c) Stop means fixed on the cylinder reaching into said passageway in the piston, adapted to stop the rigid ring, hence the resilient seal and the piston biased by the spring, in a particular position, wherein the annular seal is spaced from the abutment, on the groove by which it is received, facing the compression chamber, thereby establishing communication of the latter with the fluid supply conduit.

The above and further characteristic features and ensuing advantages will be clearly understood from the appended description referring by way of example to embodiments shown on the accompanying drawings, wherein.

On the drawings similar parts are denoted throughout the figures by the same reference numbers.

Figure 1:
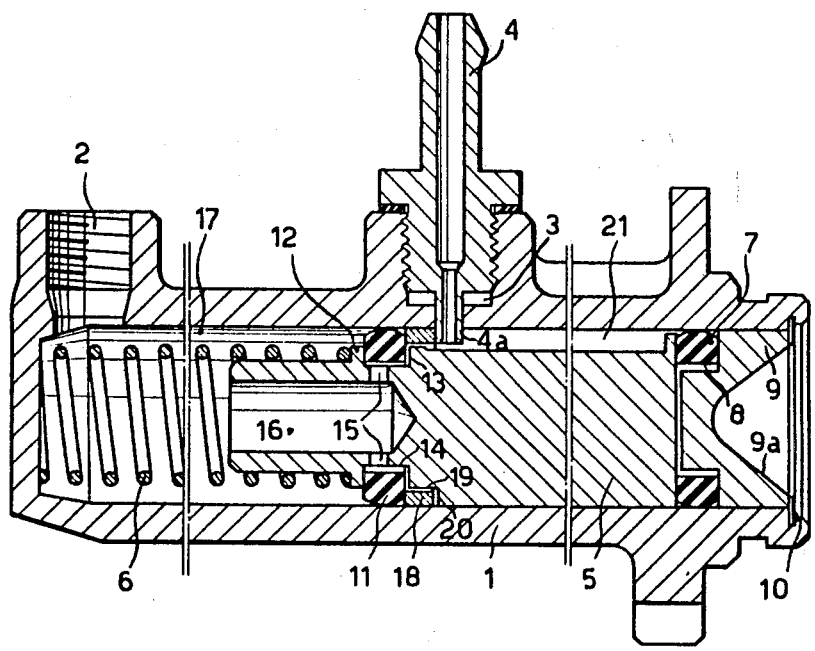
FIGURE 1 is a longitudinal sectional view of a device according to this invention suitable for use as a master cylinder in hydraulic brake mechanisms on motor vehicles.

The device shown in FIGURE 1 comprises a cylinder 1 open at one end and closed at the other. The cylinder connects with tapped openings 2, 3 adapted to receive connecting pipes which, respectively, connect the cylinder with the external circuit and, through a nipple 4, with a reservoir (not shown).

A piston 5 is movable within the cylinder 1 and is constantly biased in the direction of the open cylinder end by a reaction spring 6.

The opposite end of piston 5 bears against an annular seal 7 accommodated by a circumferential annular recess 8 in the face of a cylindrical block 9. The latter is prevented from slipping out from the cylinder 1 by an expansible resilient ring 10 seated in a circumferential groove provided in proximity to the open end of the cylinder 1. The block 9 is formed on its side facing outwardly of the cylinder opening with a recess defined by a concave surface 9a which is abutted by a push rod (not shown) connected through known linkages with the brake pedal.

A sealing means or valve is provided in the cylinder, controlling interconnection of the tapped openings 2, 3 or, better said, of the cylinder bore portion connecting with the external circuit and the cylinder bore portion connecting with the reservoir.

The sealing means or valve includes an annular seal 11 made of resilient material, similar to seal 7, the seal comprising a ring having opposed radial faces, an inner circular periphery, and an outer circular periphery having an arcuate outline when viewed transversely of said faces.

The apex of the arcuate portion of the seal 11 contacts the inner cylinder wall, the seal being floatingly received by an annular groove in the piston 5, laterally confined by annular abutments 12, 13 spaced wider apart than the axial thickness of the seal 11, and inwardly confined by a cylindrical wall 14 smaller in diameter than the bore of the ring 11.

The groove receiving the seal 11 connects through radial holes 15 with an axial hole 16 bored in a projection of piston 5 which is smaller in diameter than the other portion of piston 5, and opens into the compression chamber 17.

The sealing means or valve may be operated through a tappet means or rigid ring 18 of rectangular cross-sectional shape which is arranged near the seal 11 and has a larger bore than the bore of the seal 11. The ring is slidably mounted within the cylinder 1 substantially without any peripheral play with respect to the inner cylinder wall and is received by an annular circumferential recess cut in the body of the piston 5. Ring 18 is of rigid, wear resistant material and it absorbs wear which otherwise would be undergone by ring 11 if it directly abutted tip 4a. The recess opens in the direction of the groove receiving the seal 11 and is confined by a cylindrical wall 19 smaller in diameter than the bore in ring 18 and, on the opposite side from the seal 11, by an annular shoulder 20.

The spacing of the shoulders 13, 20 is preferably such that the rigid ring 18 does not abut the seal 11 when the seal 11 is drawn near the abutment 13 if the ring is abutting shoulder 20. A longitudinal groove 21 is formed in the outer periphery of the piston 5 and connects with the recess receiving the rigid ring 18. A tubular tip 4a on the connecting pipe 4 which is screwed into the tapped opening 3 reaches into the groove 21 and forms an abutment member for abutment ring 18.

In operation of the device, at the end of the return stroke of the piston 5 which is effected under the action of the reaction spring 6, the rigid ring 18 abuts the tubular tip 4a by which it is stopped together with the floating resilient seal 11. This allows a relative displacement of the ring 18, seal 11 and piston 5 (by holding ring 18 and seal 11 while the piston 5 moves further to the right as viewed in FIG. 1) at the end of which the seal 11 is held near the abutment 12. The movement of the piston 5 is ultimately restrained by the resistance of the ring 10.

In this final condition of the parts hydraulic brake fluid can freely flow between the inside of the nipple 4 and compression chamber 17. The hydraulic fluid flow path is through holes 16, 15, the annular groove receiving the seal 11, the recess receiving the rigid ring 18, and finally the axial groove 21 cut in the piston, as shown in FIG. 1.

Brake fluid is thereby free to flow from the reservoir to the compression chamber 17 during the return stroke of the piston as well as at the end of this return stroke, so that liquid between the brake circuit and reservoir can be drained, if necessary, even after stoppage of the piston 5.

The latter function is accomplished without any need for the conventional make-up orifice usually bored in the cylinder wall and so located as to be offset towards the compression chamber from the resilient seal.

On braking as the piston 5 moves forward against the action of the reaction spring 6, the liquid pressure in chamber 17 moves the annular seal towards the abutment 13, thereby intercepting communication of the chamber 17 and reservoir. The seal 11 is forced by hydraulic pressure towards and against the abutment 13, inasmuch as the axial dimension of the rigid ring 18 does not exceed the dimension of the seat therefor confined by walls 19, 20. The rigid ring 18 performs the function of protecting the seal 11 of resilient material against any damage which might arise when very high pressures prevail in the compression chamber 17.

A further advantage of the master cylinder of this invention is that the piston travel necessary to close off the reservoir opening 3 is shorter as compared to the travel performed by said piston where the cylinder is provided with a make-up hole between the ring 11 and the compression chamber 17.

Figure 2:
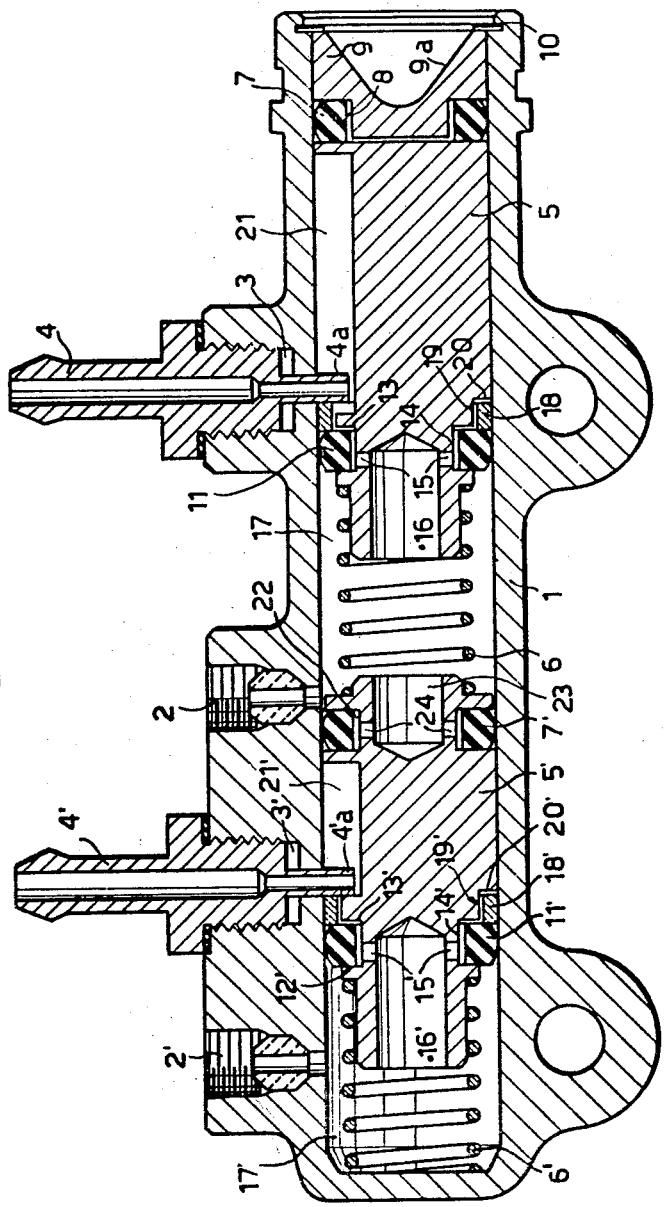
FIGURE 2 is a longitudinal sectional view of a device according to this invention suitable for use as a master cylinder in hydraulic brake mechanisms for vehicles in which separate circuits are provided for controlling front and rear vehicle wheel brakes, respectively.

The master cylinder shown in FIGURE 2 differs from the embodiment in FIGURE 1 in that the reaction spring 6 bears instead of against the bottom of the cylinder 1, on the rear portion of a second piston 5'.

The latter is provided at its end near the piston 5 with a seal 7' received by a peripheral groove 22 in the piston 5', connecting with the compression chamber 17 through an axial hole 23 and radial holes 24. The structure of the remainder of the master cylinder, apart from the detail just described, is fully similar and resembles in operation the structure of the cylinder described with reference to FIGURE 1.

The various added parts in FIG. 2 which correspond with the parts previously described with reference to FIGURE 1, are provided with the same reference numerals with the addition of an index '.

In FIGS. 1 and 2, rings 11 and 11' are sealed against the cylinder or bore wall because they are outwardly pressed by the hydraulic pressure from the fluid in passages 14–16. In FIG. 2, sealing ring 7' is sealed in a like manner by fluid in passages 23, 24, which is under pressure from the bottom compression chamber 17. It should be noted that the rigid ring 18 equalizes the upward force originating at 4a against resilient ring 11. In high pressure units, ring 18 also prevents the compression chamber pressure from pressing ring 11 down between the clearance between the piston 5 and the bore wall.

What I claim is:

1. A master cylinder for a hydraulic brake system, said cylinder comprising a body having a longitudinal bore therein, one of said bore ends being closed, the other end being open, a piston member slidably mounted in the bore, a tappet means fitted on said piston member and a trip means for the tappet means in the cylinder bore, a retaining means for preventing the said piston member from sliding out of said bore, said cylinder body having a first opening connecting with said bore at its closed end and a second opening connecting with said bore at a location between said first opening and the open end of said bore, a spring biasing said piston member towards said open end of the bore, a compression chamber between said piston and said closed end, said piston member comprising a circumferential groove including axially spaced radial shoulders and a bottom wall extending between said shoulders, a freely mounted resilient sealing ring within said groove, said ring being axially shorter than the axial distance between said shoulders and having sealing engagement with the cylinder bore and having inner diameter greater than the outer diameter of the groove bottom wall to form a first passage therebetween, said piston member including a second passage which connects said compression chamber with said first passage, said sealing ring being located at an axial position on said piston member so that when said piston member is substantially at one end of its stroke said tappet means abuts said trip means whereby the sealing ring is pushed axially towards one of said groove radial shoulders thereby forming a third passage between said sealing ring and the other radial shoulder of said groove, said first, second and third passages all forming a fluid conduit connecting said compression chamber to said second opening.

2. A master cylinder with a piston member and sealing ring freely mounted in an annular groove as claimed in claim 1 wherein said piston member includes an annular recess adjacent said groove and being defined by a bottom circumferential wall which is of greater diameter than the diameter of said groove bottom wall and further defined by a radially extending shoulder on one axial side thereof, a radial edge of said recess bottom wall coinciding with the radial edge of one of said radial shoulders of said groove, the said tappet means comprising a rigid ring freely mounted within said recess, said rigid ring having an inner diameter larger than the diameter of said recess bottom wall thereby providing a fourth passage therebetween, the axial width of said recess bottom wall being approximately equal to the axial width of said rigid ring, said rigid ring abutting against said trip means and axially displacing said sealing ring and holding same axially towards one of its groove's radial shoulders thereby forming said third passage between said sealing ring and said other radial shoulder of said groove when said piston member is substantially at said one end of its stroke, said fourth passage connecting said third passage to said second passage.

3. The master cylinder of claim 2, wherein said piston member comprises an axially extending recess in its outer periphery, said piston member being slidable in said bore with said trip means including an abutment member protruding into said axially extending recess.

4. The master cylinder of claim 3 wherein said abutment member is located adjacent said second opening and said axially extending recess comprises a fluid passage connecting said fourth passage to said second opening.

5. The master cylinder of claim 4, wherein said second opening comprises a nipple and said abutment member comprises a hollow tip on said nipple.

6. A master cylinder as defined in claim 2, wherein the trip means comprises a pin protruding radially into the cylindrical bore in a position to contact the rigid ring.

7. A master cylinder as defined in claim 6 in which the pin also serves as a stop means for the piston.

8. A master cylinder as defined in claim 6 including a stop means for the piston inserted in the open end of the cylinder bore.

9. A master cylinder for hydraulic brake systems, comprising; a cylinder having a bore therein, said bore being open at one end and closed at the opposite end thereof, first and second piston members slidingly mounted within said bore and reciprocably movable therein in respective strokes, said piston members being in axial alignment, a spring between said closed end of said bore and one end of said first piston member, a spring between the two piston members, said springs biasing said piston members towards the open end of said bore and maintaining said first piston members spaced away from said closed end of said bore and both said piston members spaced from each other, the respective spaces formed thereby comprising first and second compression chambers, sealing means located generally at the end of each piston member which is nearest the open end of said bore and serving as a fluid seal against the passage of hydraulic fluid between the piston members and the cylinder bore wall, sealing and valve means located generally at the other end of each piston member and comprising a freely mounted resilient sealing ring mounted within a circumferential groove in each piston, the ring being axially shorter than the axial distance between the shoulders of the groove and having sealing engagement with the cylinder bore, and further having an inner diameter greater than the outer diameter of the annular groove's bottom wall to form a first passage therebetween, each said piston member including a second passage which connects each said compression chamber with the first passage in each piston, the sealing ring being located at an axial position on each piston member so that when the piston member is at substantially one end of its stroke a rigid wear ring carried thereby abuts a pin protruding radially into the bore behind the rigid ring on each piston whereby the sealing ring is moved axially toward the compression chambers as the piston is at the end of its stroke to form a third passage between the sealing ring and a radial shoulder of the groove, the pin protruding in the path of the first piston functioning not only as a trip means for the freely mounted rigid wear ring for opening the valve formed by the elastic sealing ring but also as a stop means for said first piston, whereas said pin serving only as a trip means for the corresponding rigid ring on said second piston, said cylinder comprising a first and second pair of spaced openings connecting said bore with the exterior of said cylinder, said first pair of openings connecting with said compression chambers, said second pair of openings connecting with said bore at location each of which is spaced from a different one of said first openings in a direction away from said closed bore end, the sealing rings on each piston selectively closing each of the first pair of openings with a corresponding one of the second pair of openings.

References Cited by the Examiner
UNITED STATES PATENTS
2,163,874   6/39   Goepfrich _____ 60—54.6

FOREIGN PATENTS
194,737   1/58   Austria.

OTHER REFERENCES
German printed application, 1,132,814, July 5, 1962.

JULIUS E. WEST, Primary Examiner.
EDGAR W. GEOGHEGAN, Examiner.